United States Patent
Emmanuel et al.

(10) Patent No.: US 11,655,154 B2
(45) Date of Patent: May 23, 2023

(54) PROCESSES FOR CONVERTING CARBON DIOXIDE

(71) Applicant: CVMR ENERGY METALS INC., Toronto (CA)

(72) Inventors: Nanthakumar Victor Emmanuel, Toronto (CA); Kamran Khozan, Toronto (CA); Serge Kovtun, Toronto (CA); Mohammad Al Quayyum, Toronto (CA)

(73) Assignee: CVMR ENERGY METALS INC., Toronto (CA)

( * ) Notice: Subject to any disclaimer, the term of this patent is extended or adjusted under 35 U.S.C. 154(b) by 387 days.

(21) Appl. No.: 16/839,578

(22) Filed: Apr. 3, 2020

(65) Prior Publication Data
US 2020/0317526 A1    Oct. 8, 2020

Related U.S. Application Data

(60) Provisional application No. 62/829,356, filed on Apr. 4, 2019.

(51) Int. Cl.
*F01N 3/10* (2006.01)
*C01B 32/20* (2017.01)
*C01B 32/205* (2017.01)
*C01B 32/184* (2017.01)

(52) U.S. Cl.
CPC .......... *C01B 32/205* (2017.08); *C01B 32/184* (2017.08); *F01N 3/10* (2013.01)

(58) Field of Classification Search
CPC ........ C01B 32/184; C01B 32/205; F01N 3/10
See application file for complete search history.

(56) References Cited

U.S. PATENT DOCUMENTS

| | | | |
|---|---|---|---|
| 2012/0034150 A1* | 2/2012 | Noyes | C09C 1/48 423/447.2 |
| 2015/0078982 A1* | 3/2015 | Noyes | B01J 23/745 423/447.3 |
| 2015/0291424 A1* | 10/2015 | Noyes | B01J 12/007 422/187 |

* cited by examiner

*Primary Examiner* — Carl C Staubach
*Assistant Examiner* — Diem T Tran
(74) *Attorney, Agent, or Firm* — Flener IP & Business Law; Zareefa B. Flener

(57) ABSTRACT

In one aspect, there is provided a process for converting gaseous carbon dioxide, comprising: emplacing a reaction zone material, including gaseous carbon dioxide, gaseous carbon monoxide, and an operative reagent, within a reaction zone, such that gaseous carbon dioxide, gaseous carbon monoxide, and an operative reagent are disposed within the reaction zone, with effect that a reactive process is effected, such that a product material is produced; wherein: the ratio of total number of moles of gaseous carbon dioxide, disposed within the reaction zone material, to total number of moles of gaseous carbon monoxide, disposed within the reaction zone material, is at least 1:4; the operative reagent is at least one of metallic iron, metallic nickel, and metallic magnesium; and the product material includes solid carbon-comprising material.

19 Claims, 1 Drawing Sheet

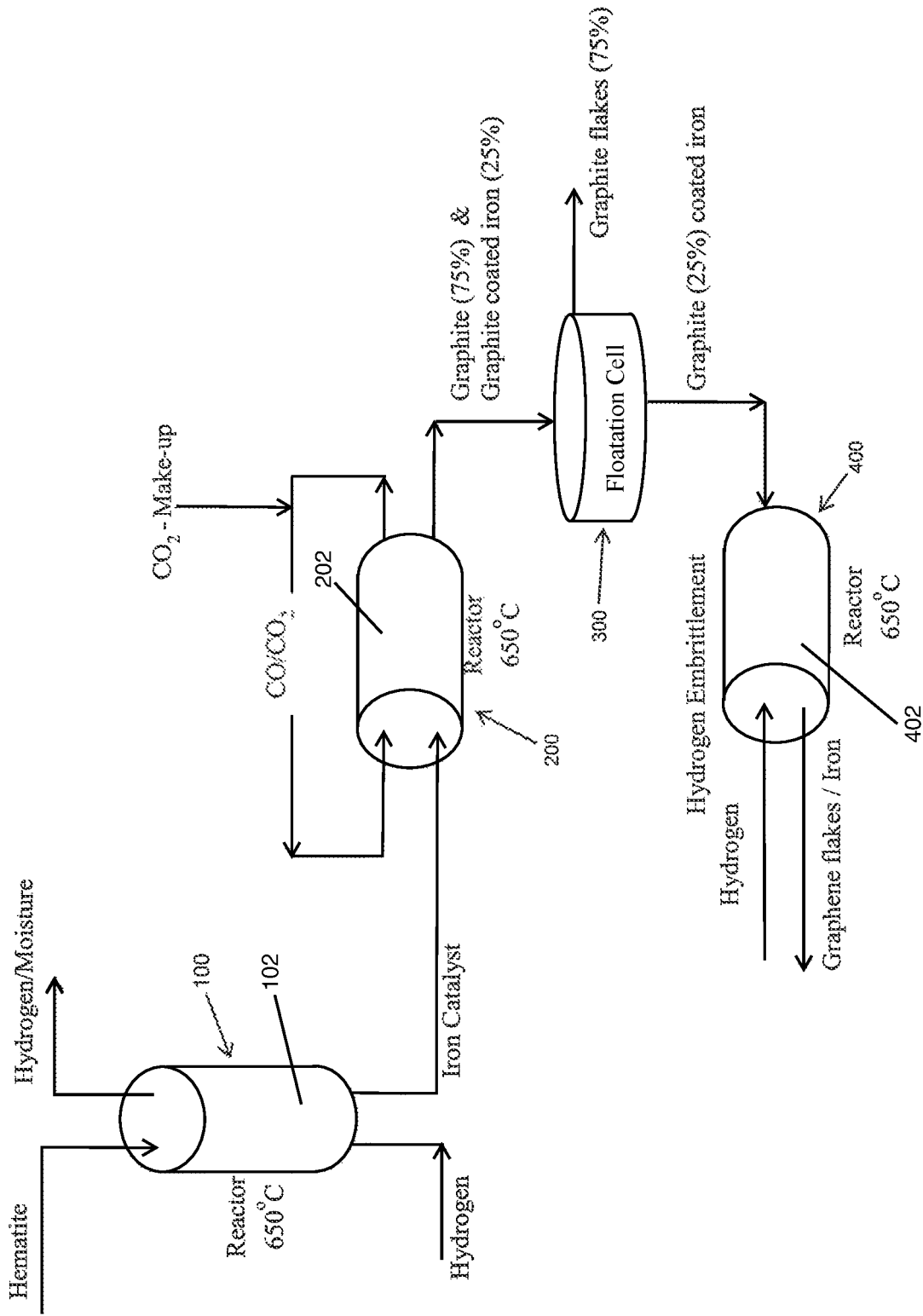

PROCESSES FOR CONVERTING CARBON DIOXIDE

FIELD

The present disclosure relates to the conversion of gaseous carbon dioxide to solid carbon.

BACKGROUND

With growing concerns over the increasing atmospheric concentration of anthropogenic greenhouse gases, effective $CO_2$ emission abatement strategies such as Carbon Capture and Storage (CCS) are required to combat this trend. CCS consists in the separation of $CO_2$ from industrial and energy-related sources, transport to a storage location and long-term isolation from the atmosphere. In this analysis, CCS consists of three basic stages: (a) separation of $CO_2$, (b) transportation and (c) storage. As an alternative to storage, the captured $CO_2$ can also find applications in different industrial processes, like catalytic conversion in high-value products ($CO_2$ valorisation by chemical conversion). $CO_2$ release and production mitigation is generally performed in post-combustion, pre-combustion and oxyfuel combustion systems.

Post-combustion capture involves removal of $CO_2$ from flue gas, for example, from the thermal power plant combustion chambers. Existing power plants use air for combustion and generate a flue gas at atmospheric pressure, which typically have a $CO_2$ concentration of less than 15%. Thus, the thermodynamic driving force for $CO_2$ capture from flue gas is low, creating a technical challenge for the development of cost effective advanced capture processes. The low concentration of $CO_2$ in power-plant flue gas (13-15% for coal-fired power plants, 7-8% for gas-fired power plants) implies handling large volumes of gas, which results in large equipment sizes and high capital costs. Technologies based on chemical absorption appear to be best adapted to this separation.

The existing technologies for post-combustion applications rely mostly on absorption towers that suffer from the complicated operational problems such as large footprint, lack of flexibility for diverse flue gas streams, and toxic chemical carryovers that are an impediment to small and medium size companies. In addition, it is challenging to convince industries to integrate currently available $CO_2$ capture technologies into their existing plants, due to high costs and the potential for interruption in their production. Another major challenge for these industries is the disposal of captured $CO_2$ into a stable form that is simple to transport and does not require elaborate infrastructure. Most of the approaches to valorize $CO_2$ are either very energy intensive or suffer from a low payback rate, neither of which is financially attractive for the private sector. The rationale behind the most recent R&D efforts in carbon capture projects are: (i) the unavailability of a modular, retrofittable $CO_2$ capture unit in the market that would be cost-effective for small to medium-size companies; (ii) the lack of a reliable storable form of captured $CO_2$; and, (iii) inventors' uncertainty about their return on their investment.

SUMMARY

In one aspect, there is provided a process for converting gaseous carbon dioxide, comprising:
emplacing a reaction zone material, including gaseous carbon dioxide, gaseous carbon monoxide, and an operative reagent, within a reaction zone, such that gaseous carbon dioxide, gaseous carbon monoxide, and an operative reagent are disposed within the reaction zone, with effect that a reactive process is effected, such that a product material is produced; wherein:
the ratio of total number of moles of gaseous carbon dioxide, disposed within the reaction zone material, to total number of moles of gaseous carbon monoxide, disposed within the reaction zone material, is at least 1:4;
the operative reagent is at least one of metallic iron, metallic nickel, and metallic magnesium; and
the product material includes solid carbon-comprising material.

In another aspect, there is provided a process for converting gaseous carbon dioxide to solid carbon, comprising:
producing gaseous exhaust material via an industrial process, wherein the gaseous exhaust material includes carbon dioxide;
treating the gaseous exhaust material such that a gaseous intermediate, enriched in gaseous carbon dioxide relative to the gaseous exhaust material, is obtained; and
emplacing a reaction zone material, including gaseous carbon dioxide, gaseous carbon monoxide, and an operative reagent, within a reaction zone, such that gaseous carbon dioxide, gaseous carbon monoxide, and an operative reagent are disposed within the reaction zone, with effect that a reactive process is effected, such that a product material is produced; wherein:
the ratio of moles of gaseous carbon monoxide, within the reaction zone, to moles of gaseous carbon dioxide, within the reaction zone, is at least 1:4;
the operative reagent is at least one of metallic iron, metallic nickel, and metallic magnesium;
the emplacing includes supplying the gaseous intermediate to the reaction zone; and
the product material includes solid carbon-comprising material.

BRIEF DESCRIPTION OF DRAWINGS

The preferred embodiments will now be described with reference to the following accompanying drawings, in which:

FIG. 1 is process flow diagram of an embodiment of a process of the present disclosure.

DETAILED DESCRIPTION

There is provided a process for converting gaseous carbon dioxide to solid carbon-comprising material.

In some embodiments, for example, the carbon dioxide is derived from a gaseous exhaust material that is produced by an industrial process. In this respect, in some embodiments, for example, the process includes producing a gaseous exhaust material, including gaseous carbon dioxide, via an industrial process.

In some embodiments, for example, the process includes treating the gaseous exhaust material such that a gaseous intermediate is obtained. The gaseous intermediate is enriched in gaseous carbon dioxide relative to the gaseous exhaust material.

In some embodiments, for example, the gaseous intermediate includes at least 20 mol % $CO_2$, based on the total moles of the gaseous intermediate, such as, for example, at least 40 mol % $CO_2$, based on the total moles of the gaseous intermediate, such as, for example at least 60 mol % $CO_2$, based on the total moles of the gaseous intermediate, such as, for example, at least 80 mol % $CO_2$, based on the total moles of the gaseous intermediate, such as, for example, 100 mol % $CO_2$, based on the total moles of the gaseous intermediate.

In some embodiments, for example, the treating of the gaseous exhaust material includes a separation process, whereby the gaseous exhaust material is separated into at least the gaseous intermediate and a carbon dioxide-depleted gaseous material. In some embodiments, for example, the separation process includes absorption of an absorbed fraction, from the gaseous exhaust material, with an absorbent such that a complexed material is obtained, and then desorbing the gaseous intermediate from the complexed material such that the gaseous intermediate (including gaseous carbon dioxide material) is obtained. In some embodiments, for example, the absorbent is a liquid absorbent, such as, for example, monoethanolamine (MEA), and the absorption of the absorbed fraction, from the gaseous exhaust material, is effected via a membrane scrubbing process, and the gaseous intermediate is then desorbed from the complexed material, and thereby regenerated, such as, for example, via cavitation-assisted degassing, such that the gaseous intermediate is obtained.

In some embodiments, for example, the treating of the gaseous exhaust material includes separating the gaseous exhaust material into at least a gaseous carbon dioxide-enriched intermediate precursor and a gaseous carbon dioxide-depleted product (such as, for example, in accordance with the separation processes described above), and converting a fraction of the gaseous carbon dioxide of the gaseous carbon dioxide-enriched intermediate precursor to gaseous carbon monoxide, with effect that the gaseous intermediate is obtained. In this respect, the produced gaseous intermediate includes gaseous carbon dioxide and gaseous carbon monoxide. In some embodiments, for example, the converting of a fraction of the gaseous carbon dioxide, of the gaseous carbon dioxide-enriched intermediate precursor, to gaseous carbon monoxide is effected in response to contacting of the gaseous carbon dioxide with water in the presence of a catalyst. In some embodiments, for example, the catalyst is an electrocatalyst. In some embodiments, for example, the catalyst includes gold, copper, or a combination of gold and copper.

The treating of the gaseous exhaust material further includes emplacing a reaction zone material within a reaction zone 202 of a reactor 200, wherein the reaction zone material includes gaseous carbon dioxide, gaseous carbon monoxide, and an operative reagent, and the emplacing includes supplying the gaseous intermediate to the reaction zone 202. The emplacing is with effect that gaseous carbon dioxide, gaseous carbon monoxide, and an operative reagent become disposed within the reaction zone 202, and is also with effect that a reactive process is effected, such that a product material is produced. The product material includes a solid product material that includes solid carbon-comprising material. The operative reagent includes at least one of metallic iron, metallic nickel, and metallic magnesium. In some embodiments, for example, the reactor 200 is a semi-fluidized bed reactor. In some embodiments, while the gaseous intermediate material is being supplied to the reaction zone, the product material is being discharged from the reaction zone 202.

In some embodiments, for example, the temperature within the reaction zone 202 of the reactor 200 is within the range of 100 degrees Celsius to 1000 degrees Celsius, such as, for example, 300 degrees Celsius to 800 degrees Celsius, such as, for example, 400 degrees Celsius to 700 degrees Celsius.

In some embodiments, for example, the pressure within the reaction zone 202 of the reactor 200 is within the range of 0 psig to 100 psig, such as, for example, 0 psig to 80 psig, such as, for example, 0 psig to 60 psig.

In some embodiments, for example, the residence time of the reaction zone material within the reaction zone 202 is at least 12 hours, such as, for example, at least 24 hours, such as, for example at least 48 hours.

In some embodiments, for example, the reactive process that is effected within the reaction zone 202 includes the following steps:

$$M + CO_2 \rightarrow CO + MO \quad (1)$$

$$2CO \rightarrow CO_2 + C \quad (2)$$

wherein M is one of Fe, Ni, or Mg.

To promote the forward reaction of the second reaction step, sufficient carbon monoxide is provided within the reaction zone 202. In this respect, the reaction zone is charged with gaseous carbon monoxide and gaseous carbon dioxide in predetermined amounts such that a desired ratio of gaseous carbon monoxide to gaseous carbon dioxide, within the reaction zone 202, is obtained.

In some embodiments, for example, the ratio of the total number of moles of gaseous carbon monoxide, disposed within the reaction zone 202, to the total number of moles of gaseous carbon dioxide, disposed within the reaction zone 202, is at least 1:4, such as, for example, at least 1:2, such as, for example, at least 1:1, such as, for example, at least 2:1. In some embodiments, for example, the ratio of the total number of moles of gaseous carbon monoxide, disposed within the reaction zone 202, to the total number of moles of gaseous carbon dioxide, disposed within the reaction zone 202, is between 1:4 and 4:1.

In some embodiments, for example, the ratio of the total number of moles of gaseous carbon dioxide, disposed within the reaction zone 202, to the total number of moles of the operative reagent, disposed within the reaction zone 202, is at least 37, such as, for example, at least 56, such as, for example, at least 111.

In some embodiments, for example, the product material is separated into at least the solid product material (including solid carbon-comprising material) and the gaseous product material by gravity separation, and the gaseous product material is recycled to the reaction zone 202. The gaseous product material includes unconverted gaseous carbon dioxide and unconverted gaseous carbon monoxide. In this respect, in some embodiments, while the product material is being discharged from the reaction zone 202, the gaseous product material is separated from the product material, and the separated gaseous product material is recycled to the reaction zone 202.

In some embodiments, for example, periodically, adscititious gaseous carbon monoxide is supplied to the reaction zone 202 for providing make-up gaseous carbon monoxide, such that the desired ratio of gaseous carbon monoxide to gaseous carbon dioxide, within the reaction zone 202, is maintained.

In this respect, in some embodiments, for example, the process includes controlling the ratio of gaseous carbon monoxide to gaseous carbon dioxide within the reaction zone 202. In some of these embodiments, for example, the controlling of the ratio of gaseous carbon monoxide to gaseous carbon dioxide within the reaction zone 202 includes: determining the ratio of gaseous carbon monoxide to gaseous carbon dioxide within the reaction zone 202, and, based on the determination, modulating the supplying of gaseous carbon monoxide to the reaction zone 202. The modulating includes initiating the supplying of adscititious gaseous carbon monoxide to the reaction zone 202, suspending the supplying of adscititious gaseous carbon monoxide to the reaction zone 202, increasing the rate of supplying of adscititious gaseous carbon monoxide to the reaction zone 202, or decreasing the rate of supplying of adscititious gaseous carbon monoxide to the reaction zone 202.

In some embodiments, for example, the determination includes sensing the concentration of gaseous carbon monoxide within the reaction zone 202 with a sensor, sensing the concentration of gaseous carbon dioxide within the reaction zone 202 with a sensor, based on the sensing, determining (for example, by a controller) the ratio of gaseous carbon monoxide to gaseous carbon dioxide within the reaction zone 202, and, in response to a determination (for example, by a controller) that the ratio of gaseous carbon monoxide to gaseous carbon dioxide within the reaction zone 202 deviates from a predetermined desired ratio (for example, based on a comparison to a predetermined desired ratio), effecting the modulation. In some embodiments, for example, the modulation is effected by regulation of a flow controller, such as, for example, a valve.

In some embodiments, for example, the emplacing of a reaction zone material, within the reaction zone 202, further includes supplying adscititious operative reagent to the reaction zone.

In some embodiments, for example, while the gaseous intermediate is being supplied to the reaction zone 202, the adscititious operative reagent is being supplied to the reaction zone 202 is being effected. In some embodiments, for example, while the gaseous intermediate is being supplied to the reaction zone 202, and the product material is being discharged from the reaction zone 202, the adscititious operative reagent is being supplied to the reaction zone 202. In some embodiments, for example, while the gaseous intermediate is being supplied to the reaction zone 202, the product material is being discharged from the reaction zone 202, and the gaseous product material of the product material is being recycled to the reaction zone 202, the adscititious operative reagent is being supplied to the reaction zone 202.

In some embodiments, for example, the operative reagent includes metallic iron, and the metallic iron, which is emplaced within the reaction zone 202, is obtained from an iron oxide source, such as hematite or magnetite. In some embodiments, for example, the iron oxide source is contacted with gaseous hydrogen within a reaction zone 102 of a reactor 100, such that the metallic iron is obtained. In some embodiments, for example, the temperature within the reaction zone 102 of the reactor 100 is within the range of 100 degrees Celsius to 1000 degrees Celsius, such as, for example, 300 degrees Celsius to 800 degrees Celsius, such as, for example, 400 degrees Celsius to 700 degrees Celsius. In some embodiments, for example, the pressure within the reaction zone 102 of the reactor 100 is within the range of 0 psig to 100 psig, such as, for example, 0 psig to 50 psig. In some embodiments, for example, the pressure within the reaction zone 102 of the reactor 100 is atmospheric pressure.

In some embodiments, for example, the produced solid carbon-comprising material includes graphite flakes. In some embodiments, for example, the produced solid carbon-comprising material includes graphite-coated iron. In some embodiments, for example, the produced solid carbon-comprising material includes both of graphite flakes and graphite-coated iron.

In those embodiments where the solid product material includes both of graphite flakes and graphite-coated iron, in some of these embodiments, for example, the solid product material is separated into at least a "graphite flakes" rich material and a "graphite-coated iron"-rich material. In some embodiments, for example, the separation is effected via floatation within a floatation cell 300.

In some embodiments, for example, the obtained "graphite-coated iron"-rich material is contacted with gaseous hydrogen in a reaction zone 402 within a reactor 400, with effect that graphene flakes are obtained. In some embodiments, for example, the contacting with gaseous hydrogen within the reaction zone 402 effects hydrogen embrittlement of the "graphite-coated iron"-rich material. In some embodiments, for example, the temperature within the reaction zone 402 of the contactor 400 is within the range of 100 degrees Celsius to 1000 degrees Celsius, such as, for example, 300 degrees Celsius to 800 degrees Celsius, such as, for example, 400 degrees Celsius to 700 degrees Celsius. In some embodiments, for example, the pressure within the reaction zone 402 of the contactor 400 is within the range of 0 psig to 100 psig, such as, for example, 0 psig to 50 psig. In some embodiments, for example, the pressure within the reaction zone 402 of the contactor 400 is atmospheric pressure. In some embodiments, for example, graphene flakes are recovered from the embrittled "graphite-coated iron"-rich material by air classification or via another floatation circuit.

In some embodiments, for example, the embrittled "graphite-coated iron"-rich material is separated (such as via air classification or another floatation circuit) into at least graphene flakes and a carbon steel-precursor. The carbon steel pre-cursor is useable for producing carbon steel.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A process for converting gaseous carbon dioxide into solid carbon, comprising:
   producing gaseous exhaust material via an industrial process, wherein the gaseous exhaust material includes carbon dioxide;
   treating the gaseous exhaust material such that a gaseous intermediate, enriched in gaseous carbon dioxide relative to the gaseous exhaust material, is produced; and
   emplacing a reaction zone material, including gaseous carbon dioxide, gaseous carbon monoxide, and an operative reagent, within a reaction zone, such that gaseous carbon dioxide, gaseous carbon monoxide, and the operative reagent are disposed within the reaction zone, and with effect that a reactive process is effected, such that a product material is produced;
   wherein:
   a ratio of a total number of moles of gaseous carbon monoxide, disposed within the reaction zone, to a total number of moles of gaseous carbon dioxide, disposed within the reaction zone, is at least 1:4;

the operative reagent is at least one of metallic iron, metallic nickel, and metallic magnesium;
the emplacing includes supplying the gaseous intermediate to the reaction zone;
the product material includes solid carbon-comprising material; and
the treating includes:
separating the gaseous exhaust material into at least a gaseous carbon dioxide-enriched intermediate precursor and a gaseous carbon dioxide-depleted product; and
converting at least a fraction of the gaseous carbon dioxide of the gaseous carbon dioxide-enriched intermediate precursor to gaseous carbon monoxide, with effect that the gaseous intermediate is obtained;
such that the gaseous intermediate includes gaseous carbon dioxide and gaseous carbon monoxide.

2. The process as claimed in claim 1;
wherein:
the emplacing includes supplying adscititious gaseous carbon monoxide to the reaction zone.

3. The process as claimed in claim 1;
wherein:
the total number of moles of gaseous carbon dioxide, disposed within the reaction zone, to a total number of moles of the operative reagent, disposed within the reaction zone, is at least 37.

4. The process as claimed in claim 1;
wherein:
the emplacing includes supplying adscititious operative reagent to the reaction zone.

5. The process as claimed in claim 1;
wherein:
a residence time of the reaction zone material within the reaction zone is at least 12 hours.

6. The process as claimed in claim 1;
wherein:
the solid carbon-comprising material includes graphite flakes.

7. The process as claimed in claim 1;
wherein:
the solid carbon-comprising material includes graphite-coated iron.

8. The process as claimed in claim 7, further comprising:
contacting the graphite-coated iron with gaseous hydrogen.

9. The process as claimed in claim 8;
wherein the contacting of the graphite-coated iron with gaseous hydrogen is with effect that hydrogen embrittlement of the graphite-coated iron is effected.

10. The process as claimed in claim 9;
further comprising:
separating the embrittled "graphite-coated iron"-rich material into at least graphene flakes and a carbon steel-precursor material; and
recovering the carbon steel precursor material.

11. The process as claimed in claim 1;
wherein:
the product material includes a gaseous product material including carbon dioxide and carbon monoxide; and
the gaseous product material is recycled to the reaction zone.

12. A process for converting gaseous carbon dioxide into solid carbon, comprising:
producing gaseous exhaust material via an industrial process, wherein the gaseous exhaust material includes carbon dioxide;
treating the gaseous exhaust material such that a gaseous intermediate, enriched in gaseous carbon dioxide relative to the gaseous exhaust material, is produced;
emplacing a reaction zone material, including gaseous carbon dioxide, gaseous carbon monoxide, and an operative reagent, within a reaction zone, such that gaseous carbon dioxide, gaseous carbon monoxide, and the operative reagent are disposed within the reaction zone, and with effect that a reactive process is effected, such that a product material including graphite-coated iron, is produced;
contacting the graphite-coated iron with gaseous hydrogen with effect that hydrogen embrittlement of the graphite-coated iron is effected; and
separating the embrittled "graphite-coated iron"-rich material into at least graphene flakes and a carbon steel-precursor material; and
recovering the carbon steel precursor material
wherein:
a ratio of a total number of moles of gaseous carbon monoxide, disposed within the reaction zone, to a total number of moles of gaseous carbon dioxide, disposed within the reaction zone, is at least 1:4;
the operative reagent is at least one of metallic iron, metallic nickel, and metallic magnesium;
the emplacing includes supplying the gaseous intermediate to the reaction zone; and
the product material includes solid carbon-comprising material.

13. The process as claimed in claim 12;
wherein:
the emplacing includes supplying adscititious gaseous carbon monoxide to the reaction zone.

14. The process as claimed in claim 13;
wherein:
the treating includes:
separating the gaseous exhaust material into at least a gaseous carbon dioxide-enriched intermediate precursor and a gaseous carbon dioxide-depleted product; and
converting at least a fraction of the gaseous carbon dioxide of the gaseous carbon dioxide-enriched intermediate precursor to gaseous carbon monoxide, with effect that the gaseous intermediate is obtained;
such that the gaseous intermediate includes gaseous carbon dioxide and gaseous carbon monoxide.

15. The process as claimed in claim 12;
wherein:
the total number of moles of gaseous carbon dioxide, disposed within the reaction zone, to a total number of moles of the operative reagent, disposed within the reaction zone, is at least 37.

16. The process as claimed in claim 12;
wherein:
the emplacing includes supplying adscititious operative reagent to the reaction zone.

17. The process as claimed in claim 12;
wherein:
a residence time of the reaction zone material within the reaction zone is at least 12 hours.

18. The process as claimed in claim 12;
wherein:
the solid carbon-comprising material includes graphite flakes.

19. The process as claimed in claim 12;
wherein:
    the product material includes a gaseous product material including carbon dioxide and carbon monoxide; and
    the gaseous product material is recycled to the reaction zone.

\* \* \* \* \*

UNITED STATES PATENT AND TRADEMARK OFFICE
CERTIFICATE OF CORRECTION

| | | |
|---|---|---|
| PATENT NO. | : 11,655,154 B2 | |
| APPLICATION NO. | : 16/839578 | |
| DATED | : May 23, 2023 | |
| INVENTOR(S) | : Nanthakumar Victor Emmanuel et al. | |

It is certified that error appears in the above-identified patent and that said Letters Patent is hereby corrected as shown below:

On the Title Page

In the left column, item (73) the Assignee:
"CVMR ENERGY METALS INC."
Should be:
--CVMR CORPORATION--.

Signed and Sealed this
Twentieth Day of August, 2024

Katherine Kelly Vidal
*Director of the United States Patent and Trademark Office*